United States Patent
Grebbell et al.

[15] 3,689,587
[45] Sept. 5, 1972

[54] PRODUCTION OF OLEFINS

[72] Inventors: John Grebbell, Woking Surrey; Thomas James Symes, Twickenham, Middlesex, both of England

[73] Assignee: BP Chemicals Ltd., London, England

[22] Filed: May 6, 1970

[21] Appl. No.: 35,224

[30] Foreign Application Priority Data

May 29, 1969 Great Britain..........27,309/69

[52] U.S. Cl. ......................260/683.15 E, 260/683.2
[51] Int. Cl................................................C07c 3/20
[58] Field of Search ..................260/683.15 E, 683.2

[56] References Cited

UNITED STATES PATENTS

| | | |
|---|---|---|
| 3,389,190 | 6/1968 | Alderson et al. .....260/683.15 |
| 3,424,814 | 1/1969 | Hambling et al. ....260/683.15 |
| 2,952,719 | 9/1960 | Appell....................260/683.2 |
| 3,260,770 | 7/1966 | Hambling.............260/683.15 |
| 3,311,673 | 3/1967 | Hall et al. ...............260/683.2 |

*Primary Examiner*—Paul M. Coughlan, Jr.
*Attorney*—Morgan, Finnegan, Durham & Pine

[57] ABSTRACT

A process for the production of $C_7$ olefins which comprises codimerising ethylene and propylene in the presence of a catalyst prepared by dispersing sodium and/or lithium on an anhydrous potassium compound to form a mixture of olefins containing $C_5$ olefins including pentene-1, isomerising at least some of the pentene-1 to pentene-2 and codimerising the $C_5$ olefins containing pentene-2 with ethylene in the presence of a catalyst prepared by dispersing sodium and/or lithium or an anhydrous potassium compound.

3 Claims, No Drawings

PRODUCTION OF OLEFINS

This invention relates to a process for the production of heptenes. British Pat. No. 1,216,277 discloses a process for the production of $C_7$ olefins which process comprises codimerizing ethylene and propylene in the presence of a catalyst prepared by dispersing sodium and/or lithium on an anhydrous potassium compound, to form a mixture of olefins containing $C_5$ olefins, and codimerizing the $C_5$ olefins with ethylene in the presence of a catalyst prepared by dispersing sodium and/or lithium on an anhydrous potassium compound.

We have now discovered that increasing the pentene-2 content of the $C_5$ fraction before further codimerization occurs results in improvements in catalyst life and productivity.

Thus according to the present invention there is provided a process for the production of $C_7$ olefins which process comprises codimerizing ethylene and propylene in the presence of a catalyst prepared by dispersing sodium and/or lithium on an anhydrous potassium compound to form a mixture of olefins containing $C_5$ olefins including pentene-1, isomerizing at least some of the pentene-1 to pentene-2 and codimerizing the $C_5$ olefins containing pentene-2 with ethylene in the presence of a catalyst prepared by dispersing sodium and/or lithium on an anhydrous potassium compound.

The main reactions in the process are represented by the following equations:

Propylene + Ethylene → Pentene-1     (1)

Pentene-1 → Pentene-2     (2)

Pentene-2 + Ethylene → 3-Ethylpentene-1     (3)

The reactions 1 and 3 may be performed in two separate stages, or by recycling the $C_5$ containing mixture from reactions 1 and 2 over the catalyst used in reaction 1.

Isomerization of the pentene-1 may be carried out after separation from ethylene, propylene and olefins higher than $C_5$ by conventional distillation techniques, although this is not essential.

Some or all of the pentene fraction containing pentene-1 is isomerized. The quantity of pentene-2 present in the feed to the second stage codimerization may be controlled by deciding what proportion of the $C_5$ fraction should be isomerized and back blending the isomerized fraction with the unisomerized material.

The potassium compound in the dimerization catalyst may be an inorganic salt, e.g., a silicate, sulphate or halide; preferably the potassium compound is potassium carbonate.

The dimerization catalyst is preferably either hydrided by pretreatment with hydrogen at a temperature preferably in the range 50° to 350°C and preferably less than 30 hours, after preparation and before use (as described in British Pat. specification No. 1,066,113) or prepared in the presence of hydrogen as claimed in British Pat. No. 1,143,993.

Preferably sodium alone is dispersed on the anhydrous potassium compound.

The dimerization catalyst may be prepared by dispersing the alkali metal on the potassium compound in a number of ways including vapor deposition of the metal, deposition in a solution in liquid ammonia with subsequent evaporation of the ammonia, deposition of the metal from a heat decomposable compound such as sodium hydride or lithium butyl, or by stirring or tumbling the molten metal with the potassium compound in the presence of hydrogen as disclosed in British Pat. No. 1,163,092 or an inert gas at a temperature in excess of the m.p. of the metal, e.g., 150°–400°C, preferably 200°–300°C for sodium, and preferably 200°–300°C for lithium, the potassium compound being selected so that it does not melt, sinter or decompose at the deposition temperature.

The preferred catalyst is that comprising 0.5 to 20 percent by weight sodium dispersed on anhydrous potassium carbonate. The catalysts more preferably contain 0.5 – 10 percent by weight of sodium and most preferably 1 – 5 percent. The potassium carbonate may be in the form of powder, granules (chips or beads) or pellets.

The catalyst may be activated before use by:
1. Contact at elevated temperature with any olefin capable of metalation, preferably propylene and/or a butene and/or a pentene.
2. Contact at elevated temperatures with olefins where dimerization or codimerization occurs, as described in British Pat. No. 962,255. These activation processes are described in British Pat. No. 1,163,092.

The dimerization temperature is preferably below 250°C, more preferably in the range 50° – 140°C. The dimerization pressure is preferably below 4,000 p.s.i.g., more preferably in the range 800 – 2,000 p.s.i.g. The propylene/ethylene molar ratio is preferably initially in the range 6:1 to 1:6, more preferably in the range 3:1 to 1:3.

The dimerization process may be carried out either in the presence or absence of a solvent. Preferred solvents are hydrocarbons, e.g., normally liquid paraffins.

The process may be effected as described in British Pat. No. 1,159,070, by either (a) incorporating a minor molar proportion of hydrogen in the feed for at least part of the time for which the feed is passed or (b) intermittently discontinuing the feed and contacting the catalyst with hydrogen in the absence of the feed preferably at a temperature in the range 50° to 350°C.

The isomerization stage may use any conventional catalyst for the isomerization of $C_5$ olefins. Suitable catalysts are silica/alumina and natural clays, usually employed at a temperature in the range 150°–300°C, supported phosphoric acid, e.g., phosphoric acid on pumice, usually employed at 150°–300°C and heteropoly acids, usually employed at 50°–300°C. Sulphided nickel-on-sepiolite is a very suitable isomerization catalyst. Its use is described in British Specification 1,002,394.

The preferred catalyst is however formed by dispersing potassium on alumina preferably at a temperature in the range 100° to 450°C. preferably the catalyst contains 0.5 – 30 percent, most preferably 2 – 10 percent, by weight of free potassium based on the weight of the alumina as measured by hydrolysis. Preferably the alumina is of the gamma type of surface area>25 m²/g. Suitably isomerization is carried out at ambient temperature and atmospheric pressure.

Preferably the feedstock will be free from impurities such as oxygen, water, sulphur compounds, dienes and acetylenes or will contain at most only a low percentage of these materials. Preferably the total content of such impurities will be less than 1.0 percent by weight of the olefinic feedstock.

The heptenes produced in this process are useful as chemical intermediates to give a wide range of products, such as lubricants, adhesives, elastomers, plastics, pharmaceuticals, insecticides, repellents, etc. They are particularly useful in the production of $C_8$ 'oxo' alcohols via the hydroformylation reaction.

The invention is illustrated but not limited by the following examples.

All the dimerization catalysts used in the examples were prepared by first drying potassium carbonate powder at 350° to 400°C under vacuum (<1mm Hg) for 30 minutes. The vacuum was released with nitrogen gas, the appropriate amount of sodium added and the dispersion stirred for 30 minutes. The amount of alkali metal on the catalyst was determined by hydrolysis.

The potassium on alumina isomerization catalyst was prepared as follows:

The alumina in the form of 3 mm tablets and having a surface area of 50 m²/g, macroporosity 86.2μl/g was dried at 250°C for 6 hours. Potassium metal (8.3 percent by weight) was added cold and the mixture heated to 200°C and tumbled for 5 hours. The resulting catalyst contained 7.4 percent by weight free potassium as measured by hydrolysis.

Example 1 illustrates the formation of heptenes from ethylene and propylene without isomerization of the intermediate pentene fraction and is provided for comparative purposes only. It does not illustrate a process according to the present invention. Reaction conditions and product analyses are given in the following table.

Examples 2–4 illustrate the formation of heptenes from ethylene and propylene with isomerization of the intermediate pentene fraction.

Isomerization was effected by passing the pentene fraction over the catalyst under the following conditions: temperature — 10°C; pressure — 20 psig and LHSV — 3.0 v/v/h.

In examples 2 and 3, 5 percent and 30 percent of the pentene fractions were isomerized respectively and back blended with the corresponding unisomerized fractions before being subjected to further codimerization. In example 4, the entire pentene fraction was isomerized. Reaction conditions and product analyses are given in the following table.

The table clearly illustrates the improvements in catalyst life and productivity obtained by using increased proportions of pentene-2.

TABLE 1

Pentene/Ethylene Codimerization

Reaction of 2:1 Molar Pentene/Ethylene at 1500 psig/LHSV 1.0 v/v/h Over Sodium/Potassium Carbonate Catalyst

| Run Number | | 1 | 2 | 3 | 4 |
|---|---|---|---|---|---|
| Catalyst | | | | | |
| Weight | g | 193 | 201 | 213 | 201 |
| % NA | | 4.3 | 4.2 | 4.35 | 4.2 |
| Reaction Temperature (Hotspot) | °C | 75–80 | 70 | 80 | 70 |
| Pentene Analysis | % wt | | | | |
| Pentene-1 | | 99.4 | 94.4 | 71.8 | 1.7 |
| Pentene-2 (t) | | 0.5 | 4.5 | 23.0 | 79.8 |
| Pentene-2 (c) | | 0.1 | 1.1 | 5.2 | 18.5 |
| | | 100.0 | 100.0 | 100.0 | 100.0 |
| Catalyst Activity | | | | | |
| Maximum yield | g/100 g/h | 20.4 | 16.8 | 23.3 | 22.7 |
| Decay rate | g/100 g/h/day | 4.7 | 1.8 | 0.5 | 0.25 |
| Overall productivity on 10 day run | g/g | 13 | 20 | 48 | 51 |
| Specificity to heptenes | % wt | 93.8 | 94.0 | 96.5 | 96.1 |
| Heptenes Analysis | % wt | | | | |
| 3-Ethylpentene-1 | | 85.6 | 84.5 | 85.8 | 79.2 |
| 4-Methylhexene-2 (c + t) | | 4.5 | 3.0 | 5.9 | 9.1 |
| Heptene-3 (t) | | 5.4 | 6.3 | 4.1 | 6.0 |
| Heptene-3 (c) | | 4.5 | 6.2 | 4.2 | 5.7 |
| | | 100.0 | 100.0 | 100.0 | 100.0 |

We claim:

1. A process for the production of $C_7$ olefins, which process comprises the steps of:
    1. Codimerizing ethylene and propylene in the presence of a catalyst consisting essentially of an alkali metal selected from sodium or lithium dispersed on an anhydrous inorganic potassium salt at a temperature below 250°C., and a pressure below 4,000 p.s.i.g. to form a mixture of olefins containing $C_5$ olefins including pentene-1 and passing the pentene-1 product to isomerization step 2;
    2. Isomerizing pentene-1 to pentene-2 with an isomerization catalyst which is prepared by dispersing potassium on alumina such that the catalyst contains 0.5 to 30 percent by weight of free potassium based on the weight of alumina, as measured by hydrolysis and passing the pentene-2 product to codimerization step 3;
    3. Codimerizing the $C_5$ olefins containing pentene-2 with ethylene in the presence of a catalyst consisting essentially of an alkali metal selected from sodium or lithium dispersed on an anhydrous inorganic potassium salt at a temperature below 250°C., and a pressure below 4,000 p.s.i.g.

2. A process according to claim 1 wherein the alumina is of the gamma type of surface area greater than 25 meters per gram.

3. A process according to claim 1 wherein isomerization is effected at ambient temperature and atmospheric pressure.

* * * * *